United States Patent [19]

Eck et al.

[11] 4,111,747
[45] Sep. 5, 1978

[54] PACKED ROD NEUTRON SHIELD FOR FAST NUCLEAR REACTORS

[75] Inventors: John E. Eck, Hempfield Township, Westmoreland County; Alvin H. Kasberg, Murrysville, both of Pa.

[73] Assignee: The United States of America as represented by the United States Department of Energy, Washington, D.C.

[21] Appl. No.: 693,990

[22] Filed: Jun. 8, 1976

[51] Int. Cl.² .............................................. G21C 1/02
[52] U.S. Cl. ................................ 176/40; 176/78; 176/87; 176/DIG. 2
[58] Field of Search .................. 176/17, 18, 40, 87, 176/DIG. 2, 78, 86 R, 50, 33

[56] References Cited

U.S. PATENT DOCUMENTS

| 2,961,393 | 11/1960 | Monson | 176/18 |
|---|---|---|---|
| 3,481,832 | 12/1969 | Rickert | 176/78 |
| 3,518,163 | 6/1970 | De Boisblanc | 176/18 |
| 3,549,493 | 12/1970 | Germer | 176/87 |
| 3,574,058 | 4/1971 | Gumuchian | 176/78 |
| 3,660,231 | 5/1972 | Fox et al. | 176/40 |
| 3,751,387 | 8/1973 | Hall et al. | 176/DIG. 2 |
| 3,801,448 | 4/1974 | Brandstetter et al. | 176/40 |
| 3,808,098 | 4/1974 | Fredin | 176/78 |

FOREIGN PATENT DOCUMENTS

| 1,429,959 | 1/1966 | France | 176/DIG. 2 |
|---|---|---|---|
| 2,162,284 | 7/1973 | France | 176/86 R |
| 1,232,811 | 5/1971 | United Kingdom | 176/78 |

OTHER PUBLICATIONS

Conf - 740116, 4/74, pp. 86-88.

Primary Examiner—Harvey E. Behrend
Attorney, Agent, or Firm—Edward L. Levine; Z. L. Dermer

[57] ABSTRACT

A fast neutron nuclear reactor including a core and a plurality of vertically oriented neutron shield assemblies surrounding the core. Each assembly includes closely packed cylindrical rods within a polygonal metallic duct. The shield assemblies are less susceptible to thermal stresses and are less massive than solid shield assemblies, and are cooled by liquid coolant flow through interstices among the rods and duct.

13 Claims, 7 Drawing Figures

PACKED ROD NEUTRON SHIELD FOR FAST NUCLEAR REACTORS

The invention described herein was made in the course of, or under, a contract with the U.S. Energy Research And Development Administration, the successor in interest to the U.S. Atomic Energy Commission.

BACKGROUND OF THE INVENTION

1. Field of the Invention

This invention relates to nuclear reactors, and more particularly to neutron shield and reflector assemblies in liquid cooled fast reactors.

2. Description of the Prior Art

A typical fast breeder reactor includes three radially distributed zones in its core region. These are first and innermost, fuel assemblies containing fissionable nuclear material, second, radial blanket assemblies containing fertile nuclear material for breeding fissionable nuclear material, and third, and outermost, removable radial shield assemblies to protect core support structures and the reactor pressure vessel from excessive radiation damage and to reflect neutrons back into the core.

A coolant, such as a liquid metal or inert gas, is circulated through the core to remove heat generated by the fissioning process. The heat flux generally decreases progressively from the core center radially outward. Consequently, different cooling requirements and assembly structures have been utilized in the three zones. The fuel assemblies typically include a plurality of small diameter rods maintained in relative position by various types of grid or other spacing structures; the radial blanket is similar, with typically larger and fewer rods per assembly. This rodded arrangement provides the large cooling surface area necessary for the coolant flowing through these hotter assemblies, and physical separation of the rods. The removable radial shield assemblies, however, require significantly less cooling. Also, in order to properly perform their protective function, there is a premium placed upon a high density material distribution in the removable radial shield zone.

As a result of the high density and low cooling criteria, typically shield assemblies have been solid, with coolant flow passageways therethrough. These have taken the form, for example, of graphite or metallic blocks of hexagonal or circular cross-section with flow holes axially therethrough. Other shield assemblies have included transverse layers of metal tightly stacked about a central axial flow tube. Although such shielding assemblies adequately protect the surrounding support structures from excessive neutron bombardment, they are not without deficiencies.

First, because of the importance of density to perform a protective function, the solid shield assemblies present a large mass. As this dense mass radially surrounds the core, and typically may also be utilized above and below the core, it presents significant safety-oriented concerns relating to core response under seismic accident or other high loading conditions. To mitigate these concerns, complex design approaches and structures must be added to the reactor.

Second, because the shield assemblies have a high mass and a relatively small coolant flow, they are susceptible to considerable thermal stresses. The thermal coefficient of expansion acts along this large mass, inducing thermal stresses with changes in reactor power level. These stresses may also introduce undesirable bowing in the shield assembly region, and consequently apply further undesirable forces to the inner core assemblies. The thermal stresses further may reduce the life of the shield assemblies, requiring time consuming replacement at relatively close intervals.

Third, in order to mitigate the negative effects of the large mass and high thermal stress conditions, the material composition of the solid or axial stacked shield blocks is rather limited. The shortened life, coupled with the lack of material selection flexibility, may significantly increase the capital and operating costs of a fast reactor over its design lifetime.

Among the prior art structures which are limited by these deficiencies is that described in U.S. Pat. No. 3,219,540 in the name of D. Costes. It includes a nuclear reactor with the internal wall of the reactor vessel lined with canned and removable elements of solid graphite moderator material, which also functions as a neutron reflector. Because graphite is incompatible with liquid coolants such as sodium in a reactor environment, the elements must be clad with a suitable material, such as zirconium or magnesium. Such designs are not only costly to manufacture, but also enhance the concerns associated with thermal stresses due to differential expansion between the clad and the graphite. Also, the mass of such elements which extend substantially the length of the vessel presents seismic response limitations.

Another prior art structure is described in U.S. Pat. No. 3,549,493 in the name of J. H. Germer, which includes a reactor core made up of bundles which are closely packed together and held together by an orificing pattern. The bundles include hexagonal fuel, blanket, and reflector bundles, the latter surrounding the outer edge of the core. Each reflector bundle may be composed of solid stainless steel penetrated by cooling passages. This structure, therefore, presents an undesirable large mass surrounding the core, and a separate orificing or hydraulic balancing arrangement to support the assemblies. As a solid mass, however, the structure is also susceptible to thermal stresses and undesirable seismic loads.

While some fuel assemblies such as that described in U.S. Pat. No. 3,011,962 in the name of L. J. Koch et al contain fuel rods of fissionable nuclear material within a protective metal cladding, spaced within an enclosing duct, it is to be noted that this invention does not relate to fuel assemblies but is directed to neutron shield and reflector assemblies which typically surround the fuel assemblies. Not only are the functional requirements of these assembly types different, but also the limiting design criteria are very different. For example, because the fuel rods generate a high thermal and neutron flux, they must be provided with much higher coolant flows than required in the shield assemblies.

Also, in order to prevent undesirable boiling and bubble formation along the rods, typically both a high coolant flow rate and some device to induce swirling flow about the rods are utilized. Such devices may include wire wrapping about the rods, or flow deflectors, either in grid-structures which align the fuel rods or in a fuel rod duct. Merely a predominantly vertical flow along the fuel rods will cause boiling at a lower than desirable fuel rod temperature.

Furthermore, to similarly minimize "hot-spot" or wear locations along the fuel rods, they are spaced from one another. The structures used for this spacing are typically the grids or wire wrap referred to above. It is therefore to be noted that the design criteria and resulting structures applied to fuel assemblies are significantly different than those applied to shield assemblies.

It is therefore seen that significant operational, safety, and cost benefits can be obtained from a neutron shield assembly which alleviates the above deficiencies of the prior art.

SUMMARY OF THE INVENTION

This invention provides neutron shield and reflector assemblies for liquid cooled fast neutron reactors that not only protect surrounding core structures from radiation effects, but also reduce the mass of the shield assembly zone. It therefore provides a better core response and design flexibility regarding seismic loading. It further is less responsive to core thermal effects, thereby reducing thermal stresses and potential assembly bowing. These advantages further result in cost and maintenance reductions throughout the lifetime of the fast reactor.

The disclosed shield assembly includes a thin-walled polygonal vertically oriented metallic duct. The duct forms the outer boundary of the shield assembly, and is placed in the core adjacent other core assemblies and structures. Placed within the duct is a bundle of cylindrical metallic rods in a close-packed, parallel and coextending arrangement, which substantially fills the duct cross-section. The liquid coolant flows through the interstices among the rods and duct.

The rods are supported within the duct by the close-packed array. Each individual rod is of a relatively small mass as compared to a solid shield block, and consequently, is less susceptible to thermal stresses, expansions, and potential bowing. Preferably, the duct is coextensive with other core assemblies, although the rods need desirably be coxtensive only with the active portion of the core. A cylindrical rod in selected shield assemblies can also be replaced with a hollow tube within which surveillance test specimens may be placed.

BRIEF DESCRIPTION OF THE DRAWINGS

The function and advantages of this invention will become more apparent from the following description and accompanying drawings, in which.

DESCRIPTION OF THE PREFERRED EMBODIMENTS

Figure 1:
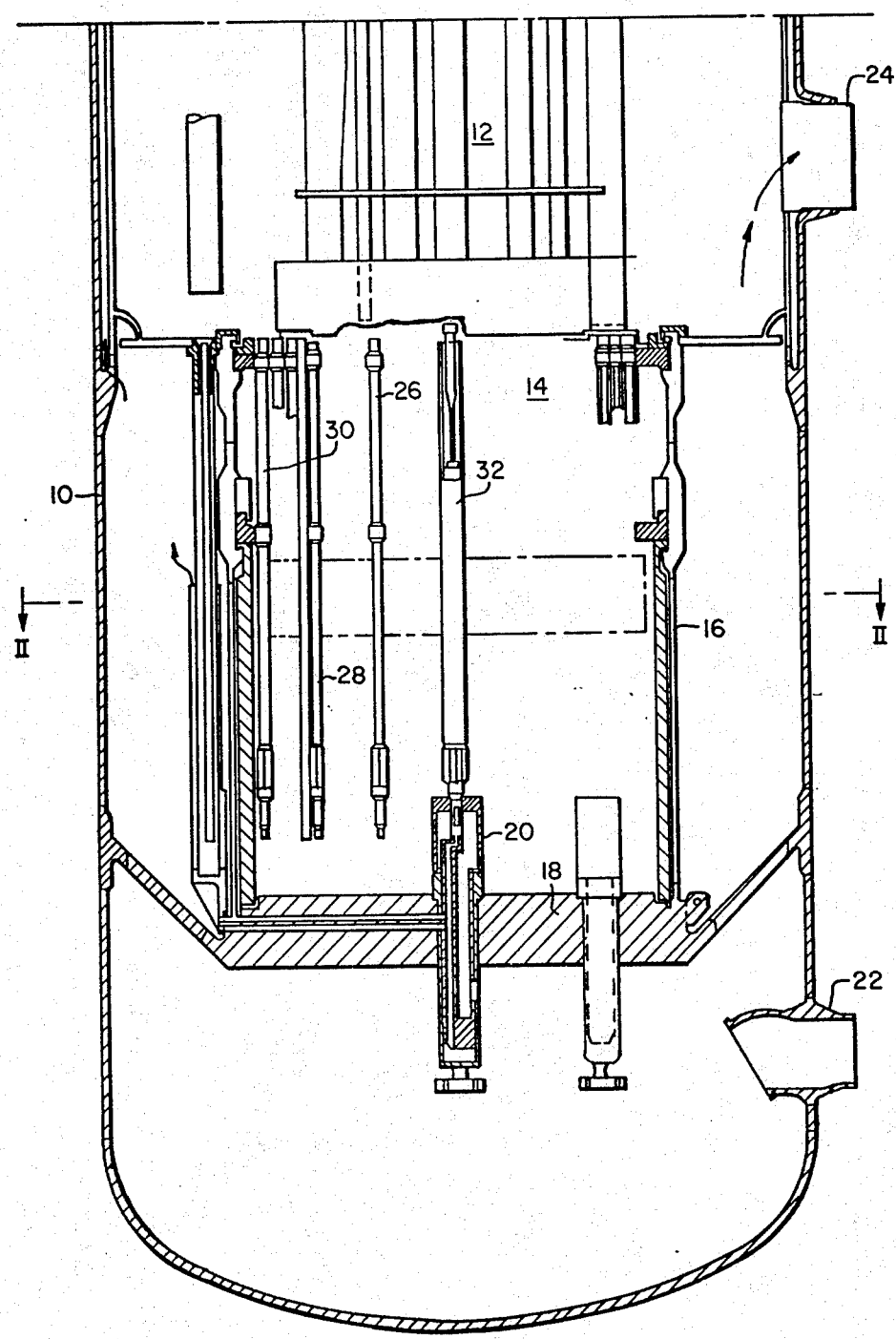
FIG. 1 is an elevation view, in partial cross-section, of a typical fast reactor to which this invention may be applied.

In order to provide a background for a better understanding of the invention, reference is made to FIG. 1 which shows a reactor vessel 10 of an exemplary liquid cooled fast reactor. Components shown within the vessel 10 include an upper internals structure 12 and a lower internals structure 14 including a core barrel 16, a lower support plate 18, and inlet modules 20 for supporting core assemblies, discussed below.

During operation the reactor coolant, such as liquid sodium, enters the vessel 10 through a plurality of inlet nozzles 22, passes through inlet modules 20, and then flows upwardly in thermal interexchange with core assemblies. The heated coolant is then discharged through a plurality of outlet nozzles 24, and then typically passes through heat exchangers where heat is transferred to, for example, a steam cycle for generation of electrical energy.

Figure 2:
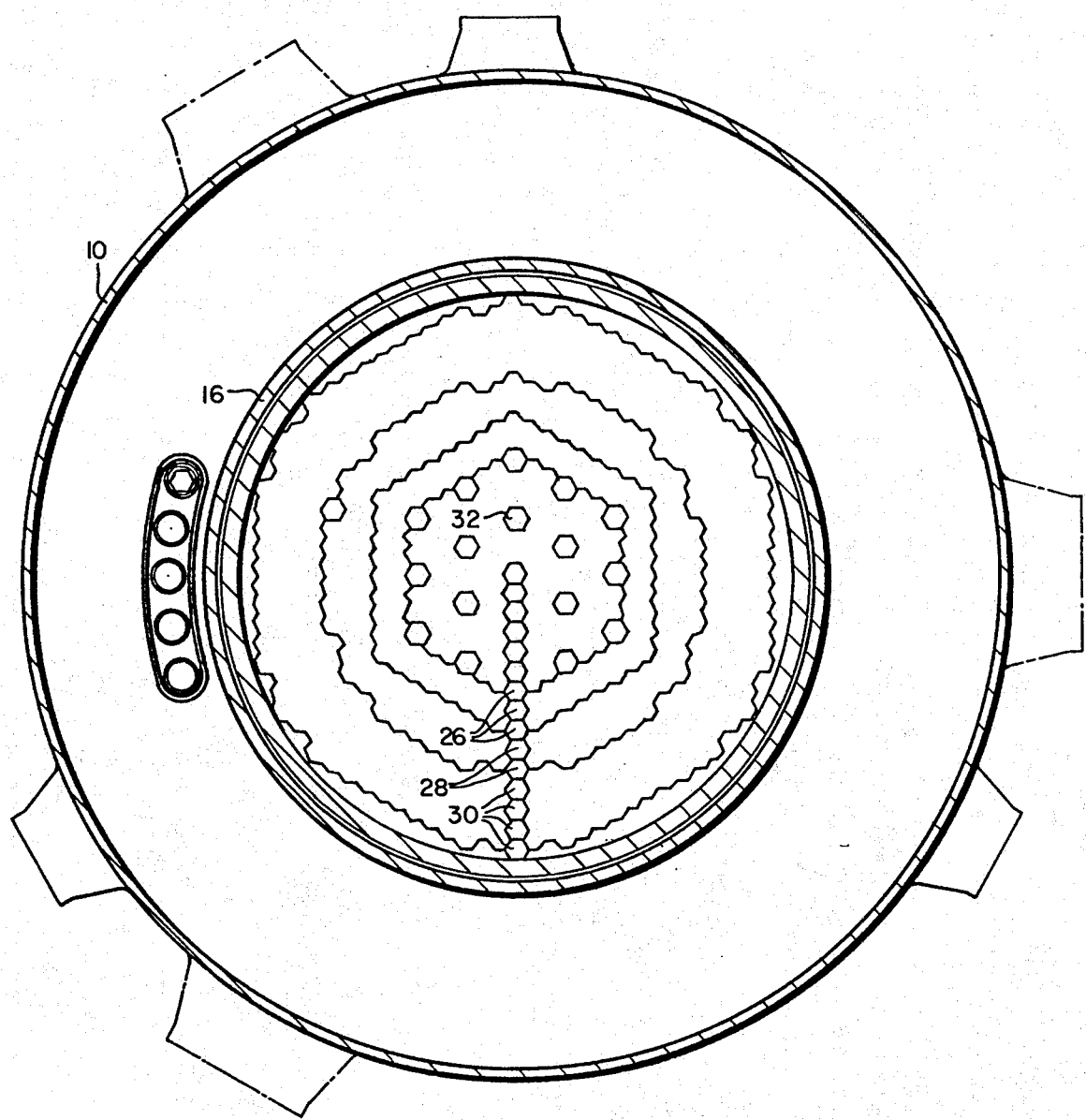
FIG. 2 is a plan view taken at II—II of FIG. 1.

The exemplary fast reactor, in addition to providing useful heat energy, may be utilized to breed fissionable nuclear material from fertile nuclear material. An arrangement of removable core assemblies for such a reactor is shown simplified in FIGS. 1 and 2, and includes vertically oriented fuel assemblies 26, radial blanket assemblies 28, and radial shield assemblies 30. The fuel assemblies 26 typically make up the central zone, or zones, of the core, with the radial blanket 28 and radial shield 30 assemblies making up an intermediate and outer radial zone respectively. Control assemblies 32 are also placed at preselected core locations.

The fuel assemblies 26 include fissionable nuclear material. Typically the fissionable nuclear material is axially distributed in the center portion of the fuel assemblies, as shown by the dotted line of FIG. 1. Both above and below the fissionable material there may be an axial blanket of fertile material. A typical fuel assembly includes these materials encased in fuel rods including a low neutron absorption material cladding, such as tubular zircaloy or stainless steel. A plurality of these rods, laterally spaced from one another, are encased in a low neutron absorption material duct. There may be several radial zones of varying enrichment of fissionable nuclear material. In the exemplary reactor there is an inner zone of 108 fuel assemblies 26 enriched to approximately 18.7% in plutonium oxide, and an outer zone of 90 fuel assemblies 26 enriched to about 27.1% in uranium-plutonium oxide. This fissionable region is approximately 36 inches in axial height, with 14 inches of axial blanket above and below it typically comprising clad depleted uranium dioxide. Approximately 80 percent of the coolant flow through the vessel 10 passes through the fuel assemblies 26.

Radially surrounding the fuel assemblies are 150 radial blanket assemblies 28 including rods of clad fertile material laterally spaced in a duct. The fertile nuclear material in the blanket assemblies 28 of the exemplary reactor is depleted uranium dioxide, axially coextensive with the 36 inches of fissionable material and the 28 inches of fertile material in the fuel assemblies 26. Approximately fourteen percent of the coolant flow passes through the blanket assemblies 28.

Figure 3:
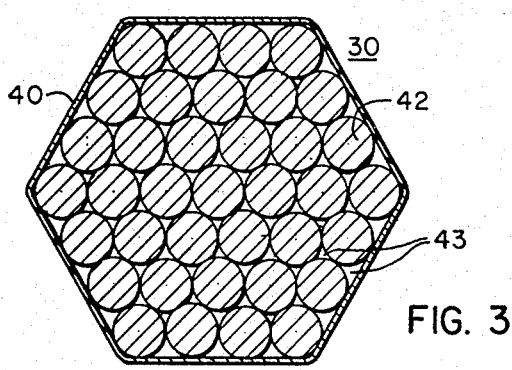
FIG. 3 is a plan view, in cross-section, of a shield assembly in accordance with this invention.
Figure 4:
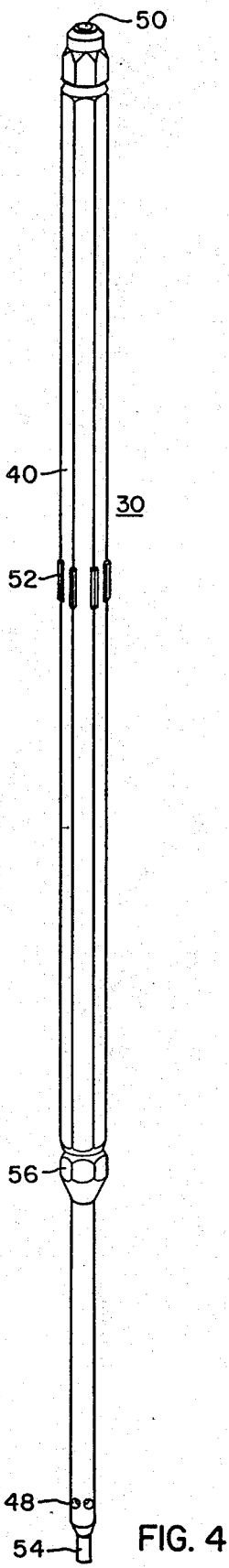
FIG. 4 is a perspective schematic, in elevation, of a removable radial shield assembly in accordance with this invention.

Radially surrounding the blanket assemblies 28 are the removable radial shield assemblies 30, to which this invention is primarily directed. A cross-section of a radial shield assembly in accordance with the invention is shown in FIG. 3, and an exterior perspective view is shown in FIG. 4. There is shown a thin-walled metallic enclosure duct 40. The duct 40 cross-section may be of any polygonal shape, although advantageously a regular polygon is preferred. The duct includes a coolant inlet 48 and coolant outlet 50, and may also include load pads 52 through which loads are transferred to and from adjacent assemblies. The radial shield assembly 30 may further include means, such as the discriminator post 54 for assuring proper assembly placement and orientation. Also, the radial shield assemblies may include means for orificing the coolant flow through the duct, such as the orifice assembly 56. Within the duct 40 are a bundle of substantially cylindrical parallel rods 42 which are closely packed and substantially fill the duct 40 cross-section. The terms "closely packed," or "close packed," when used herein and in the appended claims, refer to a regularly patterned array of circular cross-sectioned members, such as cylindrical rods or tubes, packed within the enclosure duct 40 such that the members are held in the duct by virtue of the packing array and are thereby restrained from any substantial lateral movement. In other terms, the members are self-supporting within the duct. For example, in the embodiment shown in FIG. 3 the duct 40 is of regular hexagonal cross-section, rounded at the corners, and rods 42 of a single diameter are patterned in a triangular pitch. It should be noted, however, that members, such as the rods 42, of differing diameter may also be used. In this regard, the terms "substantially filling" or "substantially filled" refer to an array that fills greater than 75 percent of the duct internal cross-section, in order to provide an effective shield. Also, substantially filled refers to no more than 92 percent of the duct internal cross-section being filled by the circular cross-sectioned members, in order to allow sufficient liquid coolant flow. This percentage also represents a practical upper limit for substantially filling the duct with cylindrical members. As the plurality of individual rods 42 are significantly less affected by thermal expansions in the lateral direction than a solid block, and the packing of circular rods provides a plurality of interstices 43 among the rods and the duct for coolant flow, a relatively small percentage of coolant flow through the shield assemblies 30 is required. In the exemplary reactor approximately 1.5 percent of the total flow is allocated to the shield assemblies 30.

In the embodiment shown in FIG. 3, the duct 40 wall thickness is 0.060 inches. The inside reference dimension across the hexagonal duct flats is 4.490 inches. The solid cylindrical rods 42 are each 0.716 inches in diameter. There are 37 rods packed within the duct. It will be apparent to one skilled in the art that these parameters may be varied and still maintain the functional requirements. The parameters can desirably be varied in view of economical, manufacturing, or material and component availability factors. For example, in a given reactor the shape and lateral dimension of the duct 40 will likely be the fixed parameter for a shield assembly 30. Therefore, for example, given a regular hexagon 4.335 inches internally across flats, it can be shown that rods 42 of many diameters, arranged on a triangular pitch, would be usable. This is shown in Table I:

TABLE I

| Number of Rods | Rod Diameter (Inches) | Rods Cross-Section/ Duct Internal Cross-Section (Percentage) |
|---|---|---|
| 7 | 1.587 | 85.0 |
| 19 | 0.971 | 86.5 |
| 37 | 0.700 | 87.4 |
| 61 | 0.547 | 88.0 |
| 91 | 0.449 | 88.4 |
| . | . | . |
| 217 | 0.292 | 89.2 |
| . | . | . |
| 1027 | 0.135 | 90.0 |

TABLE I-continued

Figure 5:
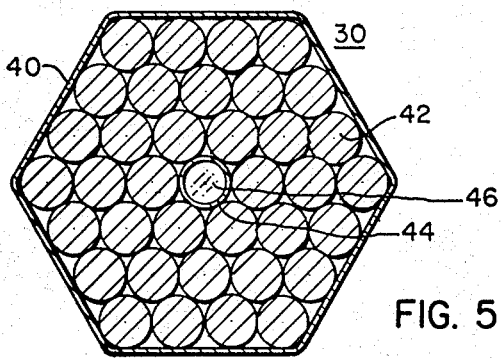
FIG. 5 is a sectional plan view, similar to FIG. 3, showing another embodiment of the invention.
Figure 6:
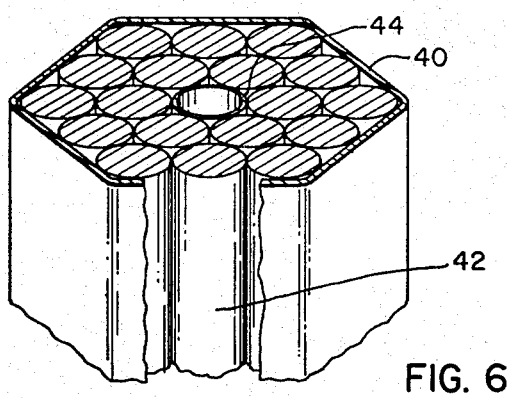
FIG. 6 is a perspective view, in elevation, of an embodiment of the invention.

Another embodiment of the invention is illustrated in FIG. 5. This embodiment is similar to that of FIG. 3; it differs, however, in that one of the rods 42, preferably the centermost, is replaced with a thin walled cylindrical tube 44 of the same outside diameter. The tube 44 location may be utilized for additional coolant flow, or, preferably, as a surveillance specimen location. Surveillance specimens are typically placed in and about reactor cores and periodically removed and tested in order to obtain data on material changes under irradiation and reactor temperature conditions. A surveillance specimen may be positioned in the tube by means well known in the art. Most simply, the tube can be provided with a surveillance support piece 46, with or without a flow hole (not shown) therethrough, upon which a specimen or string of specimens, removably rests. Also, the specimens could be affixed within the tube 44 and separated therefrom for testing subsequent to removal of the tube 44 from the shield assembly 30. It should here be noted that the preferred triangular pitch array geometrically allows for removal of an individual rod 42 or tube 44 without disturbing the position of the remaining rods. FIG. 6 shows an embodiment similar to FIG. 5, differing in the number of solid cylindrical shield rods 42. FIG. 6 is a perspective view, shown for clarity.

Figure 7:
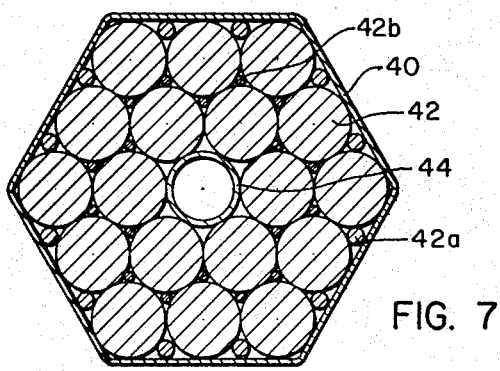
FIG. 7 is a plan view, in cross-section, of yet another embodiment of the invention.

Another embodiment is shown in FIG. 7. It is similar to that shown in FIGS. 5 and 6; however, it additionally includes close packed interstitial rods at preselected locations among the cylindrical shield rods 42. In this embodiment there are 18 solid rods 42 1 inch in diameter, one cylindrical tube 44 1 inch in outside diameter, twelve outer rods 42a 0.252 inches in diameter, and 18 interstitial rods 42b 0.156 inches in diameter. The smaller rods 42a, 42b increase the packing density about five percent, and would only be used in the event additional density was required.

It will be apparent to those skilled in the art that the invention advantageously provides a high degree of flexibility in material selection. Cylindrical metallic rods 42 can be manufactured, or purchased, of numerous shield materials. The preferred material for the duct 40, rods 42, and tube 44 is 316 stainless steel, 20% cold worked. High nickel alloys, such as Inconel 600 can also advantageously be used. The duct 40, rods 42, and tube 44 are preferably of the same material, although such is not necessary. Neutron shield materials more effective than the solid metallic rods can also be used, including those not compatible with a liquid coolant such as sodium. For example, uranium-molybdenum alloys and boron carbide can be used by cladding them with a compatible sealed tube such as stainless steel. Clad tubes, however, would significantly increase cost and thermal concerns.

It will also be recognized by those skilled in the art that this invention advantageously allows the ability to place the shield material, the rods 42, only at those elevations where it is required by the specific core design. For example, the duct 40 may be coextensive with the axial height of the fuel 26 or blanket 28 assemblies, and the rods 42 coextensive with the active portion of the fuel assemblies, i.e., the portion containing enriched fissionable nuclear material.

It can also be seen that this invention provides a radial neutron shield assembly with significantly advantageous functional features. The assembly is not as susceptible to thermal loads as solid assembly orientations, is relatively flexible, and therefore lessens undesirable bending and stressing of the assembly. It can therefore remain in a core for extended operating cycles. It provides, through interstices among the rods and duct, sufficient cooling and controlled vertical flow paths. The invention is readily adaptable to other structural members for support and also ease of handling. For example, the duct may be simply and removably supported from its lower extremity, or integrally affixed in a removable lower assembly structure. The rods need not be supported in addition to the close packing support, although they can be provided with secondary support from below by support means such as an orificed plate affixed inside the duct, or additionally supported at other positions. The assembly is relatively light in weight, simplifying support design, particularly under assumed seismic conditions. Therefore, if desirable, the invention may readily be utilized in assemblies placed above or below the core assemblies. It also provides a convenient means for support and positioning of surveillance specimens.

It will further be apparent that many modifications and additions are possible in view of the above teaching. It therefore is to be understood that within the scope of the appended claims, the invention may be practiced other than as specifically described.

We claim:

1. A fast neutron nuclear reactor including a core and means for circulating a liquid coolant through said core, said core having a plurality of vertically oriented fuel assemblies bearing fissionable nuclear material, a plurality of vertically oriented blanket assemblies bearing fertile nuclear material, and a plurality of removable radial neutron shield assemblies disposed radially about said blanket assemblies, at least some of said shield assemblies each comprising:
    (a) a metallic polygonal thin-walled enclosure duct having an internal cross-section, and
    (b) a bundle of vertically disposed parallel solid cylindrical rods of a neutron shielding material closely packed within and substantially filling said duct cross-section such that said rods are held in position solely by said close-packed arrangement, said rods are contiguous with each other and are self-supporting within said duct,
    whereby a portion of said circulating coolant flows through interstices formed within each said shield assembly among said rods and said duct.

2. The reactor of claim 1 wherein all of said solid cylindrical rods are of the same diameter.

3. The reactor of claim 1 wherein said polygonal duct is a regular polygon.

4. The reactor of claim 3 wherein said regular polygon is a regular hexagon.

5. The reactor of claim 1 wherein said duct is axially coextensive with said fuel and blanket assemblies.

6. The reactor of claim 1 wherein said solid cylindrical rods are axially coextensive with said fissionable nuclear material.

7. The reactor of claim 1 wherein said metallic duct and solid cylindrical rods are comprised of a metal selected from the group consisting of stainless steel and a high nickel content alloy.

8. The reactor of claim 1 wherein said solid cylindrical rods are packed within said duct on a triangular pitch.

9. A fast neutron nuclear reactor including a core and means for circulating a liquid coolant through said core, said core having a plurality of vertically oriented fuel assemblies bearing fissionable nuclear material, a plurality of vertically oriented blanket assemblies bearing fertile nuclear material, and a plurality of removable radial neutron shield assemblies disposed radially about said blanket assemblies, each said shield assembly comprising:
    (a) a vertically disposed metallic polygonal thin-walled enclosure duct having an internal cross-section, and
    (b) a bundle of vertically disposed solid cylindrical, parallel, and coextending rods in a close-packed self-supporting arrangement within and substantially filling said duct cross-section such that said rods are held in position solely by said arrangement, said rods each comprising a neutron shield material encased in a cylindrical sealed metallic cladding, said rods are contiguous with each other and are self-supporting within said duct.

10. A fast neutron nuclear reactor including a core and means for circulating a liquid coolant through said core, said core having a plurality of vertically oriented fuel assemblies bearing fissionable nuclear material, a plurality of vertically oriented blanket assemblies bearing fertile nuclear material, and a plurality of removable radial neutron shield assemblies disposed radially about said blanket assemblies, at least some of said shield assemblies each comprising:
    (a) a vertically disposed metallic polygonal thin-walled duct having an internal cross-section, and
    (b) a bundle of vertically disposed solid cylindrical rods disposed within said duct in a preselected lateral array, said array providing sole support for said rods within said duct, said rods are contiguous with each other and are self-supporting within said duct.

11. The reactor of claim 9 wherein said preselected lateral array is a triangular array.

12. A fast neutron breeder nuclear reactor circulating a liquid coolant including a core having a plurality of vertically oriented nuclear fuel assemblies including fuel assemblies bearing fissionable nuclear material and breeder fuel assemblies bearing fertile nuclear material, a support structure radially surrounding said core, and a removable radial shield interposed between said fuel assemblies and said support structure, said shield including a plurality of vertically oriented neutron shield assemblies, at least one of said shield assemblies interposed between said fuel assemblies and said support structure to receive a surveillance specimen, said shield assembly comprising:
    (a) a metallic regular polygonal thin-walled duct having a vertical axis therethrough,
    (b) a cylindrical metallic tube disposed about said axis, said tube being open at the top and having a support piece at the bottom for supporting said surveillance specimen, and
    (c) a plurality of vertically disposed solid metallic rods arranged in a close packed array between said tube and said duct such that said rods and tube are solely supported within said duct by said close packed array, said rods are contiguous with each other and are self-supporting within said duct.

13. The fast neutron nuclear reactor of claim 1 wherein the lateral cross-section of said rods fills greater than 75 and less than 92 percent of said duct internal cross-section.

* * * * *